(12) United States Patent
Zaniboni

(10) Patent No.: US 11,898,969 B2
(45) Date of Patent: Feb. 13, 2024

(54) SURFACE QUALITY INSPECTION METHOD AND APPARATUS

(71) Applicant: I.M.A. Industria Macchine Automatiche S.p.A., Ozzano dell'Emilia (IT)

(72) Inventor: Carlo Zaniboni, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 206 days.

(21) Appl. No.: 17/058,848

(22) PCT Filed: May 21, 2019

(86) PCT No.: PCT/EP2019/063123
§ 371 (c)(1),
(2) Date: Nov. 25, 2020

(87) PCT Pub. No.: WO2019/228868
PCT Pub. Date: Dec. 5, 2019

(65) Prior Publication Data
US 2021/0208084 A1    Jul. 8, 2021

(30) Foreign Application Priority Data
May 28, 2018  (IT) .................. 102018000005752

(51) Int. Cl.
*G01N 21/952* (2006.01)
*A24F 40/80* (2020.01)

(52) U.S. Cl.
CPC ........... *G01N 21/952* (2013.01); *A24F 40/80* (2020.01)

(58) Field of Classification Search
CPC ...... G01N 21/952; G01N 21/88; G01N 21/90; G01N 2021/845; G01N 2021/909;
(Continued)

(56) References Cited

U.S. PATENT DOCUMENTS 5,287,524 A    2/1994 Rizzoli et al.
5,392,359 A *  2/1995 Futamura .............. G06T 7/0006
                                              209/536

(Continued)

FOREIGN PATENT DOCUMENTS

CN    207202049 U    4/2018
DE    102009039612 A1  3/2011
(Continued)

OTHER PUBLICATIONS

Int'l Search Report and Written Opinion dated Jul. 17, 2019 in Int'l Application No. PCT/EP2019/063123.
(Continued)

*Primary Examiner* — Hoa Q Pham
(74) *Attorney, Agent, or Firm* — Panitch Schwarze Belisario & Nadel LLP

(57) ABSTRACT

A method and an apparatus for the surface quality inspection of the external surface of at least one component for inhalers or vaporizers, in particular a cartomizer for electronic cigarettes, verifies whether there are surface imperfections on the external surface of the components.

15 Claims, 4 Drawing Sheets

(58) Field of Classification Search
CPC ........... A24F 40/80; A24C 5/34; A24C 5/345;
G06T 7/0002
USPC ........... 356/237.1–237.5, 429–431; 382/149,
382/141, 144, 145; 250/559.43, 559.41
See application file for complete search history.

(56) References Cited

U.S. PATENT DOCUMENTS

| | | | |
|---|---|---|---|
| 9,247,213 B2* | 1/2016 | Aono | ................. G01N 21/9515 |
| 2011/0102783 A1 | 5/2011 | Wiemer et al. | |
| 2015/0199827 A1 | 7/2015 | Agazzi et al. | |
| 2015/0289565 A1 | 10/2015 | Cadieux et al. | |
| 2021/0195949 A1* | 7/2021 | Zaniboni | ................. A24F 40/10 |

FOREIGN PATENT DOCUMENTS

| | | | |
|---|---|---|---|
| EP | 1724569 | A2 | 11/2006 |
| EP | 2924419 | A2 | 9/2015 |
| EP | 3023773 | A1 | 5/2016 |
| WO | 2010017863 | A1 | 2/2010 |

OTHER PUBLICATIONS

Third Party Observation for Application No. EP20190724842, filed May 11, 2021.

\* cited by examiner

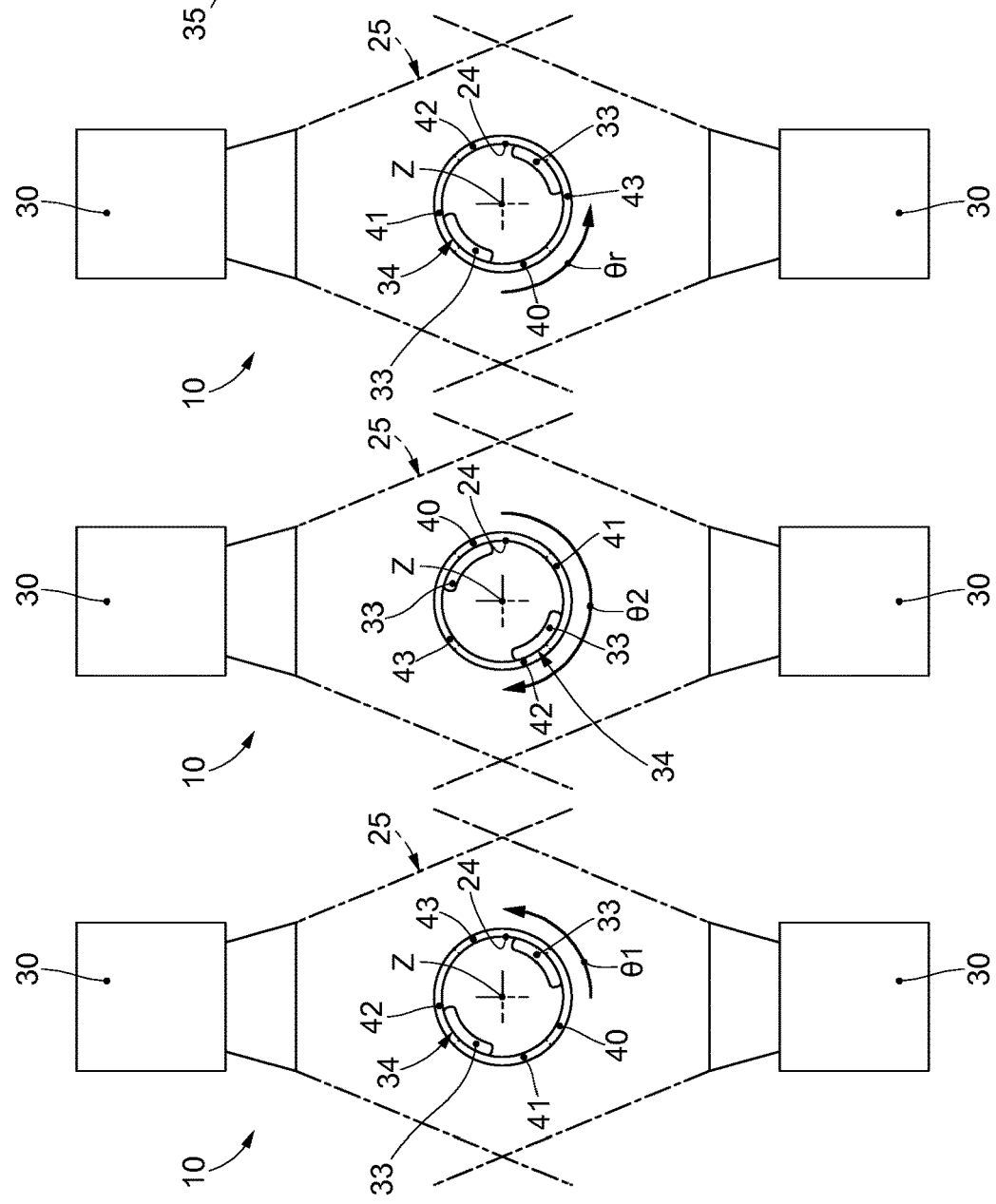
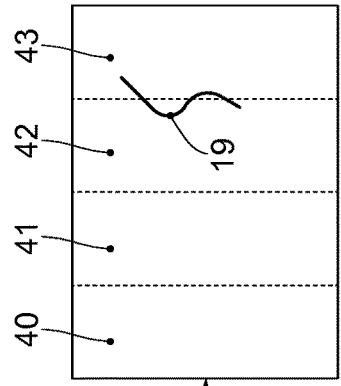
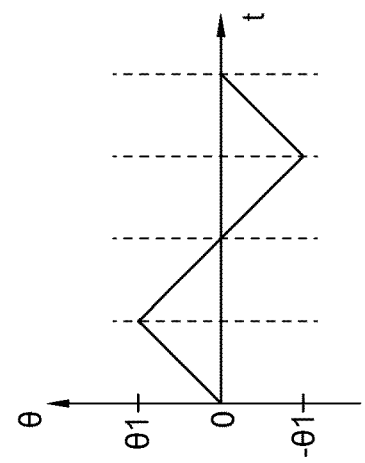

SURFACE QUALITY INSPECTION METHOD AND APPARATUS

CROSS-REFERENCE TO RELATED APPLICATIONS

This application is a Section 371 of International Application No. PCT/EP2019/063123, filed May 21, 2019, which was published in the English language on Dec. 5, 2019 under International Publication No. WO 2019/228868 A1, and which claims priority under 35 U.S.C. § 119(b) to Italian Patent Application No. 102018000005752, filed on May 28, 2018; and the disclosures of each application cited in this paragraph are incorporated herein by reference.

FIELD OF APPLICATION

The present invention refers to a surface quality inspection method of components for inhalers or vaporizers, for example a cartomizer for an electronic cigarette, i.e. objects composed of at least a protective body which contains an atomizer that can generate vapour from a liquid substance.

In particular, the present invention is related to a method and an apparatus for the surface quality inspection of the external surface of a cartomizer, or any other component of inhalers or vaporizers, to verify whether the latter presents surface imperfections.

The present invention can be applied in a production line for the production and/or finishing of components of inhalers or vaporizers, in which the shape and appearance of the external surface must be preserved.

STATE OF THE ART

In the field of inhalers in general and electronic cigarettes in particular, one component that receives particular attention from the manufacturers of such products is the so-called cartomizer, that is a cartridge of a substantially tubular form that contains an atomizer that is able to selectively transform into vapour a particular liquid that is also contained by that same cartridge.

In the case of electronic cigarettes the size of a single cartridge is substantially equivalent to the size of a regular tobacco cigarette, for example having a length of approximately 60 mm and an external diameter of approximately 9 mm and an outward surface with a tactile and aesthetic finish that will be appreciated by the user.

Each cartridge has openings at either end, through which it is possible to access at the elements contained by the cartridge, for example a small reservoir for the liquid that is to be vaporized and the electric and electronic parts of the atomizer.

In particular, in one end of the cartridge there is a compartment that can accommodate a capsule that contains substances to be extracted, either in solid form, such as ground tobacco leaf, possibly also flavoured, or in liquid form, for example nicotine.

The other end of the cartridge, on the other hand, is contiguous to said electric components and allows these to be connected to suitable power supply.

One of the technical problems that designers of machines for the treatment of said components have to face and solve is to handling the components mechanically and automatically without damaging, not even slightly, the external surface of each component, for example a cartomizer.

In the technical field of electronic cigarettes and the production of the components that make up such articles, it is known that the components should have a precise shape to allow their use, since in the presence of deformations, even small ones, it is impossible to correctly connect the components of the electronic cigarette together.

In this regard it is also known that the external surfaces of the components must be pleasant from an aesthetic point of view, and therefore they must not show any surface imperfections, such as scratches, cuts, dents, or otherwise.

Methods and apparatuses exist for the inspection of surface quality, but these present numerous problems and have not been able to provide an efficient and complete solution.

Some known solutions require numerous manipulations of the cartomizers which, besides requiring much time for their execution, also frequently cause surface imperfections to the external surface of the cartomizers.

As a result of the numerous operations generally required to inspect the external surface, the known solutions involve high costs, both due to the resultant rejected components, and in terms of production limits.

It is also known that the known solutions do not permit the simultaneous inspection of the whole external surface of a plurality of cartomizers in a manner that is fast and precise.

The problems of the prior art are accentuated by the extremely high assembly times, and by the small dimensions of the components in question.

There is therefore a need to improve and make available a surface quality inspection method, as well as a related apparatus, that overcome at least one of the drawbacks of the prior art.

The object of the present invention is to provide a method capable to rapidly inspect the external surface of a component for inhalers or vaporizers, in particular for a cartomizer for electronic cigarettes.

The invention also lends itself to optimising the handling of the cartomizers in such a manner that the whole external surface can be inspected while avoiding the risk of damaging it.

One goal of the present invention is to provide an apparatus for surface quality inspection that is able to be integrated in a production line and/or for the finishing of cartomizers, and such as it can rapidly execute precise and measured operations also on a plurality of cartomizers simultaneously.

To overcome the drawbacks of the prior art and to obtain said and further goals and advantages, the Applicant has studied, experimented and created the present invention.

SUMMARY OF THE INVENTION

The present invention is described and characterized in the independent claims, whereas the dependent claims present other characteristics of the present invention, or variants on the idea of the main solution.

Embodiments of the present invention described here refer to a surface quality inspection method of an external surface of at least one component for inhalers or vaporizers, in particular a cartomizer for electronic cigarettes.

Said component comprises an internal compartment and it is configured to be placed in a housing seat.

In accordance with one aspect of the present invention, the surface quality inspection method comprises the steps of:
  removing the component from the housing seat, holding it by at least one internal surface of the internal compartment;
  positioning and maintaining the component in an optical inspection zone outside said housing seat;

rotating the component in order to position it in at least two optical inspection positions angularly distinct with respect to each other;

acquiring at least one image of a portion of the external surface in each of the two angularly distinct positions;

processing the acquired images in order to verify if there are surface imperfections on the external surface.

These operations allow to rapidly inspect the external surface, including portions of the external surface not directly facing the position from where the images are acquired.

The acquired images can comprise at least two portions of at least partially different areas of the external surface of the component.

According to possible advantageous embodiments, the method provides removing the component by handling it exclusively by the internal surface.

This allows to frame the external surface and move the component without risking any damage to the external surface.

By handling the component exclusively by the internal surface it is possible to inspect also the whole external surface of the component without covering any part of the latter.

It is furthermore possible to inspect the external surface of the component without reducing the brightness of any part of the external surface of the component, for example by not casting any shadows on the external surface to be inspected.

According to possible embodiments, the method provides rotating the component around its longitudinal axis.

This solution is advantageous since it limits the movements and makes it possible to limit the space needed for the inspection of the external surface.

In accordance with possible embodiments, the method provides to acquire the image of the external surface during the rotation of the component.

This solution allows the surface inspection operations to be carried out in a very short time, reducing the overall time needed for the inspection.

According to possible embodiments, the method provides to acquire images of the entire external surface.

According to possible embodiments, the method can provide positioning and maintaining the component in the optical inspection zone to perform an optical inspection of the substantially entire external surface of the component.

According to possible embodiments, the method may provide to acquire images which cover, in combination, the substantial entire external surface of the component.

In accordance with possible embodiments, the images comprise portions of the external surface, arranged side by side, or partly overlapping each other.

The possibility of acquiring images of portions arranged side by side or partly overlapping, allows to obtain a reconstructed image of the entire external surface.

This operation will be more precise and reliable when the portions partly overlap each other, as the acquired common parts can be used as reference points for the reconstruction of the overall image.

According to possible embodiments, the method provides to acquire the images of at least two opposite positions with respect to the optical inspection zone.

The presence of two positions from which the images are acquired, allows to speed up the inspection and to limit the angle of rotation of the component, in particular to 90°.

In accordance with possible embodiments, the method provides the rotation of the component by an angle equal to 90°.

According to possible embodiments, the method provides picking up and/or rotating and/or inspecting a plurality of components simultaneously.

This solution improves inspection times without limiting the inspection to only those portions of the external surface facing the position from which the images are acquired.

In accordance with possible embodiments, the method provides the removal of one or more components that have imperfections on their external surface.

This operation can be carried out immediately after the detection of the presence of a surface imperfection, or in any other subsequent moment.

According to possible variants, in cases where the component has at least one protective cap associated with at least one of its ends, the method provides to remove the protective cap before or during the removal of the component from the housing seat.

In this case, the method may provide re-associating the protective cap at the end after having verified the possible presence of surface imperfections on the external surface.

This possibility is provided so that components with protective caps can be inspected without renouncing the possibility of inspecting the entire surface including the covered parts when the protective caps are present.

According to further embodiments, the present invention also relates to an apparatus for the inspection of surface quality, i.e. the optical inspection of a surface, comprising a gripping and moving member configured to remove the component from the housing seat to position it in an optical inspection zone outside of the housing seat, at least one optical acquisition device configured to acquire images of the external surface in each of the angularly distinct positions, and a processing unit configured to process the images acquired in order to verify if the component has at least one surface imperfection on the external surface.

The gripping and moving member is provided with gripping means configured to grip the component by at least one internal surface of the internal compartment and maintain it in the optical inspection zone, and rotation means configured to rotate the component and position it in at least two angularly distinct positions.

According to possible embodiments, the gripping means are configured to pick up the component by the internal surface only.

According to possible embodiments, the rotation means are configured to rotate the component around its longitudinal axis.

In accordance with possible embodiments, the gripping means comprise at least two gripping portions movable between at least a first position, in which the gripping portions are in contact with the internal surface, and a second position, in which the gripping portions are not in contact with the internal surface.

According to possible embodiments, the gripping portions are radially movable with respect to the longitudinal axis.

According to possible embodiments, the gripping means comprise one or more suction nozzles configured to keep, during use, at least one portion of the gripping means in contact with the internal surface.

According to possible implementable solutions, the apparatus comprises at least two optical acquisition devices that frame the optical inspection zone from two opposite positions with respect to the optical inspection zone.

DESCRIPTION OF THE DRAWINGS

These and other characteristics of the present invention will become clear in the following description of embodiments, provided as non-limiting examples, with reference to the enclosed drawings, wherein:

FIGS. 5-7 schematically illustrate a possible operational sequence for the inspection of surface quality;

FIG. 8 schematically illustrates an image of the external surface reconstructed with a surface quality inspection method;

FIG. 9 illustrates the progression of the angle of rotation during the operational sequence described in FIGS. 2-4;

For ease of understanding identical reference numbers have been used where possible in order to identify common elements in the figures. This means that elements and characteristics of one embodiment can conveniently be incorporated in other embodiments without additional clarifications.

DESCRIPTION OF EMBODIMENTS

Figure 1:
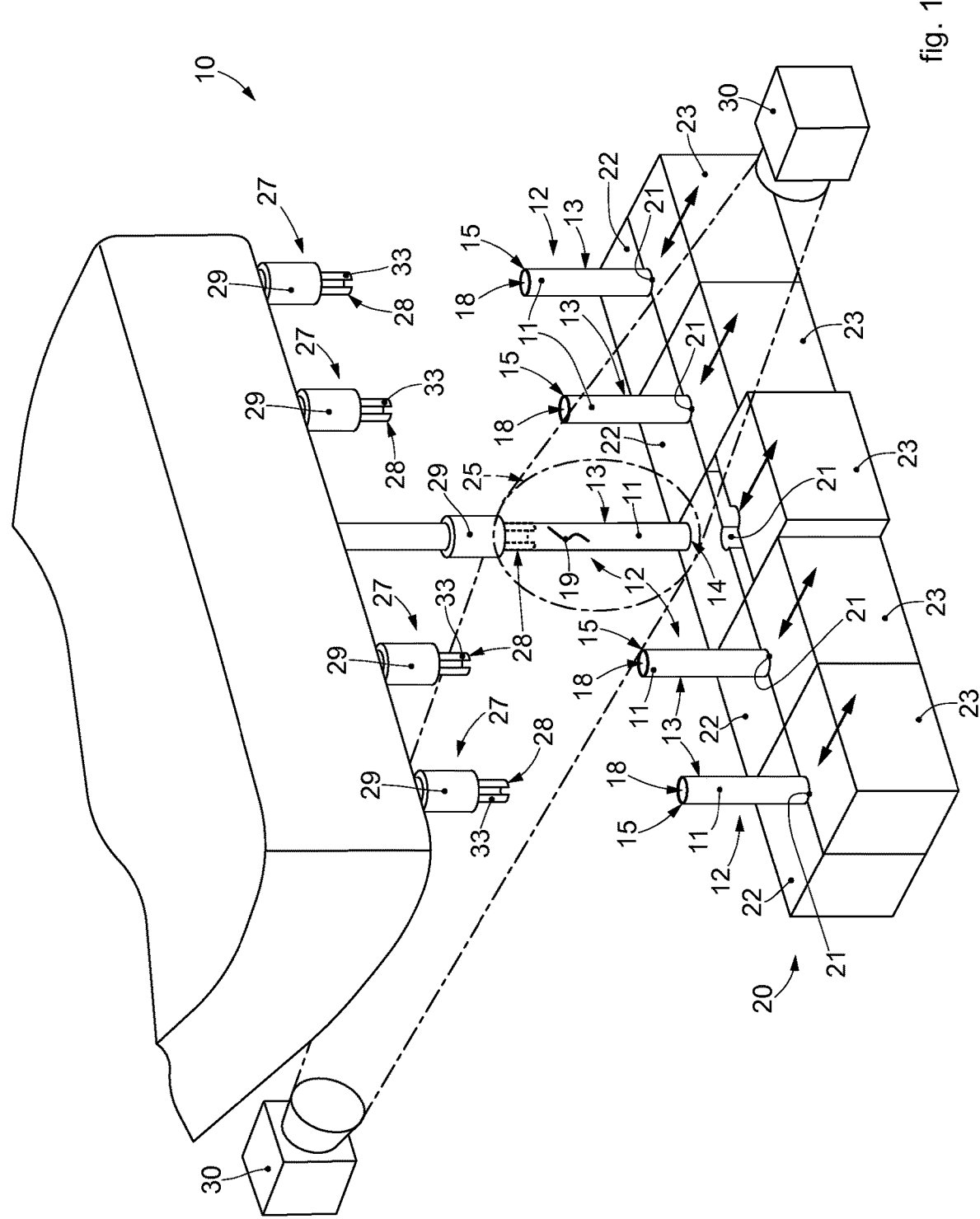
FIG. 1 is a schematic perspective view of a surface quality inspection apparatus as in one of the described embodiments.
Figure 4:
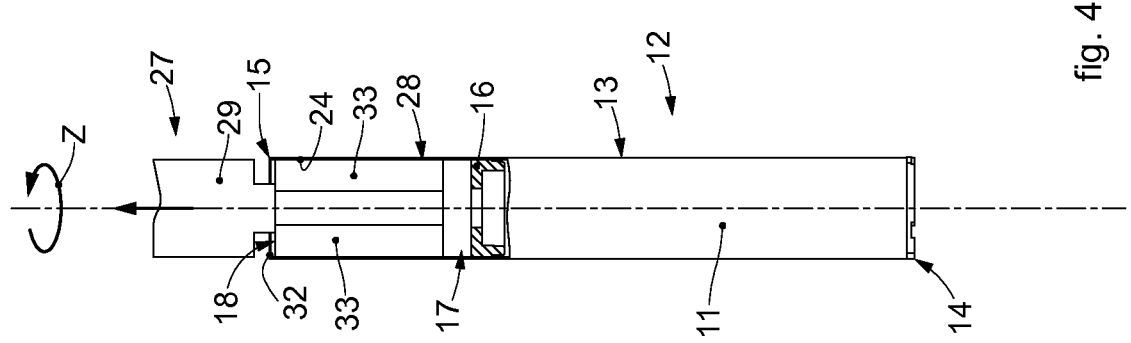
FIGS. 2-4 schematically illustrate three operational steps of a method for the inspection of surface quality as in one of the described embodiments.
Figure 3:
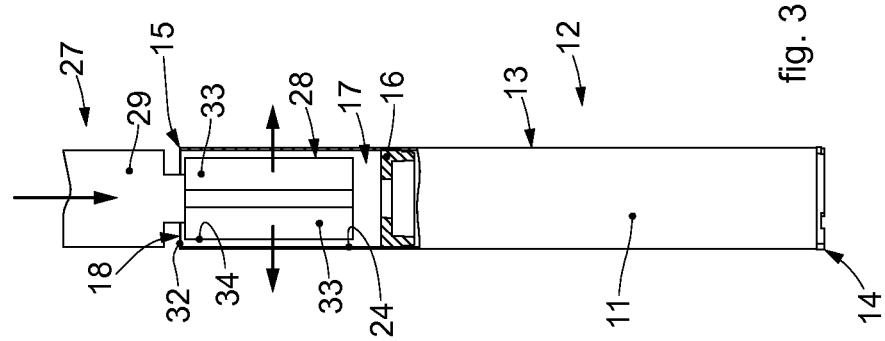
Figure 2:
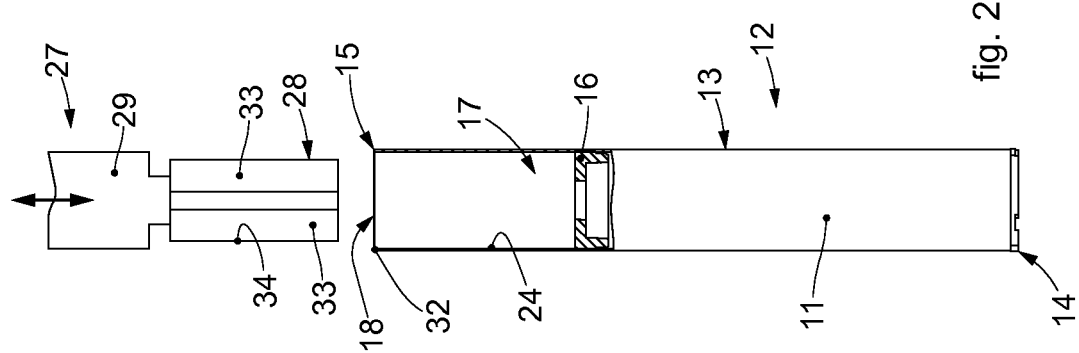
Figure 10:
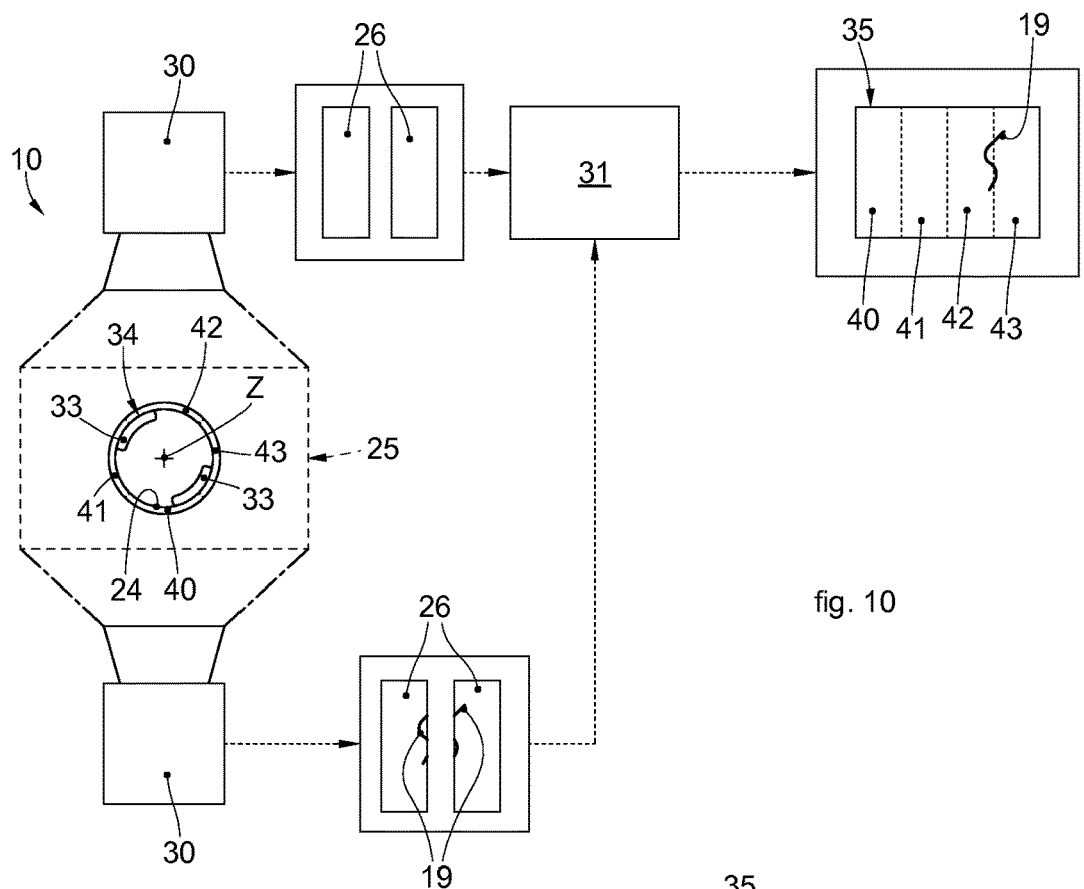
FIGS. 10-11 schematically illustrate two possible embodiments of a surface quality inspection apparatus.
Figure 11:
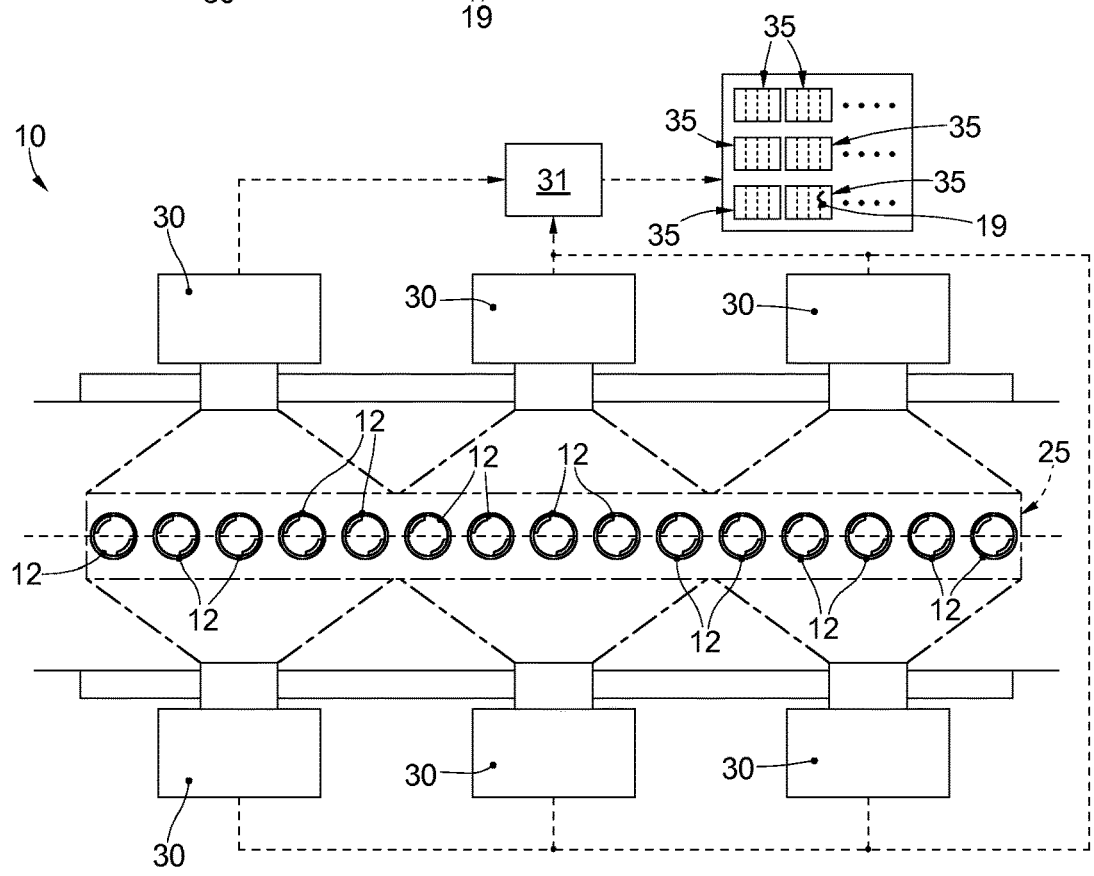

The embodiments described here refer to a method and an apparatus 10 for the inspection of surface quality, i.e. optical inspection, of the external surface 11 of at least one component 12 for inhalers or vaporizers, in particular electronic cigarettes.

By way of non-limiting example, the method and the apparatus 20 for surface quality inspection can be used to inspect the external surface 11 of a cartomizer 12 for electronic cigarettes.

The apparatus 10 and the surface inspection method according to the present invention allow the entire external surface 11 to be inspected without damaging it during the inspection.

The apparatus 10 can advantageously be integrated in an automatic assembly and/or inspection line for said components 12 for inhalers or vaporizers.

The present invention allows for the inspection of a plurality of cartomizers 12 in a very short time so that it is possible to reach high production rates.

To better understand the inventive aspects of the present invention, before describing in detail the method and related apparatus 10, first an example of a cartomizer 12 design will be described, it being understood that the present invention is not limited to this example but that it can be used for the automatic treatment of components for inhalers of the kind already known or that will be developed in the future.

By way of example a cartomizer 12 comprises a protective body 13, for example a tubular body, having an internal cavity that is open at both ends and an external surface 11, treated in a known manner to be pleasant to touch and have an aesthetic appearance.

Within the context of electronic cigarettes it is necessary that the external surface 11 of a cartomizer 12 does not have any scratches, dents or other surface imperfections, in order to be able to correctly associate the cartomizer 12 with the tobacco capsule and the electric power supply.

In the example given here, the cartomizer 12 has a length of approximately 60 mm and an external diameter of approximately 9 mm, and the thickness of the cylindrical wall of the central body 12 is approximately 0.2 mm.

The cartomizer 12 comprises a lower end 14 and an upper end 15.

In the lower end 14, inside the cavity a heating unit is located, around which a tubular element made of glass fibre is arranged.

Coaxial with the latter and against the internal wall of the cavity a bushing is arranged. In the annular space between the tubular element and the bushing a cotton felted cloth is arranged, which is configured to be imbued with a specific liquid that is intended to be vaporized during the selective activation of the heating unit.

The cartomizer 12 can comprise a blocking ring 16, also known as an e-stopper, arranged over the felted cloth imbued with liquid.

Inside the open-ended cavity the blocking ring 16 defines an internal compartment 17 that extends for a depth of approximately 8-9 mm from the access opening 18 to the upper end 15.

The internal compartment 17 is configured to potentially accommodate a tobacco capsule, or some other substance that is suitable to provide a specific flavour to the vapour inhaled by the user.

Each cartomizer 12, during its transport and packaging, or until it is used by the end user, can be conveniently protected in such a manner that at least its lower end 14, i.e. the part near the heating unit, and the upper end 15, i.e. the part near the internal compartment 17, are protected from any undesirable contact, impact or damage.

To provide this protection, in accordance with possible embodiments, each cartomizer 12 can comprise protective caps that cover, at least partially, the external surface 11 of the cartomizer 12.

In some embodiments, the cartomizer 12 can comprise a lower cap that covers the lower end 14 and an upper cap that covers the upper end 15.

In one embodiment the caps can be made of a soft and transparent material, for example silicone.

It is understood that the present invention can be used for the optical inspection of external surfaces 11 of other components 12 of inhalers or vaporizers, in addition to the cartomizer described above.

Embodiments of the present invention can be employed for the optical inspection of the external surface 11 of a component 12 having at least an access opening 18 to an internal compartment 17.

For example, the component 12 can have a tubular form, wherein it is necessary that its external surface 11 does not present any surface imperfections 19. Potential surface imperfections 19 could be, for example, scratches, cuts, dents, or other.

By way of example only, references in the following to cartomizer 12 are also intended to include other components for inhalers or vaporizers, in particular for electronic cigarettes.

According to possible embodiments, transfer sliders 20 can be provided configured to present a plurality of cartomizers 12 to the optical inspection apparatus 10.

In some possible embodiments the transfer sliders 20 can be moved by means of a transportation device (not illustrated), for example a chain or a closed-loop belt.

According to some possible embodiments, each transfer slider 20 can have a plurality of housing seats 21 that can hold the respective cartomizers 12. Each transfer slider 20 can comprise five housing seats 21, for example.

The housing seats 21 can be aligned along a linear direction of movement.

The housing seats 21 can be defined by at least a fixed portion 22 associated with a corresponding movable portion 23.

Each housing seat 21, and in particular each movable portion 23 is independent from the others, i.e. each movable portion 23 can be moved independently from the other movable portions 23.

For example, each movable portion 23 can be moved by means of a linear actuator, a pneumatic member, or some other means of movement.

The fixed portion 22 and the movable portion 23 can comprise suction means, for example nozzles, suction pads, or other, configured to hold the cartomizers 12 in position in the housing seats 21.

Such suction means allow the cartomizers 12 to be held in position and prevent the external surface 11 of the cartomizer 12 from being damaged.

The movable portion 23 allows the cartomizer 12 to be selectively held in position in the housing seat 21, thanks to the interaction between the fixed portion 22 and the movable portion 23.

According to possible embodiments, the cartomizers 12 are held in position in the housing seats 21 oriented in a vertical position with the access opening 18 directed upwards.

According to some possible embodiments, one or more cartomizers 12 are presented to the optical inspection apparatus 10 in their respective housing seats 21.

In accordance with possible embodiments, the optical inspection method of the external surface 11 of at least one cartomizer 12 for electronic cigarettes comprises the steps of:
- removing the cartomizer 12 from the housing seat 21, holding it by at least one internal surface 24 of the internal compartment 17,
- positioning and maintaining the cartomizer 12 in an optical inspection zone 25,
- acquiring at least one image 26 of the external surface 11,
- rotating the cartomizer 12 around its longitudinal axis Z,
- processing the image 26 acquired in order to verify if the cartomizer 12 has at least one surface imperfection 19 on the external surface 11.

According to some possible embodiments, the surface quality inspection apparatus 10 comprises at least one gripping and moving member 27 having gripping means 28 and rotation means 29, at least one optical acquisition device 30 configured to acquire the images 26 of the external surface 11, and a processing unit 31 configured to process the images acquired by the optical acquisition device 30.

The gripping and moving member 27 is configured to remove the cartomizer 12 from the housing seat 21 to position it in the optical inspection zone 25.

According to some possible embodiments, the apparatus 10 can comprise a plurality of gripping and moving members 27 that are independently movable.

According to some possible embodiments, the apparatus 10 can comprise a plurality of gripping and moving members 27 placed alongside each other along a linear direction.

In that case, it is advantageous that the gripping and moving members 27 are distanced from each other at the same interval as the cartomizers 12 in the housing seats 21.

Each gripping and moving member 27 can comprise a moving member able to position the gripping and moving member 27 itself along a linear direction.

According to some possible embodiments, the apparatus 10 can comprise a moving member configured to position a plurality of gripping and moving members 27 along respective linear directions.

The linear direction along which each gripping and moving member 27 can be moved, can be defined by the respective longitudinal axes Z of the cartomizers 12.

The moving member can be configured to position the gripping and moving members 27 in correspondence with the longitudinal axes Z of the cartomizers 12.

Each gripping and moving member 27 is movable at least between a first position in which it is in contact with the cartomizer 12 and a second position in which the gripping member does not interact with the cartomizer 12.

For example, when the cartomizers 12 are placed below the respective gripping and moving members 27, each gripping and moving member 27 can independently come into contact with the respective cartomizers 12.

The gripping means 28 are configured to cooperate with at least one internal surface 24 of the internal compartment 17. For example, the gripping means 28 are configured to remain in contact with the internal surface 24.

The gripping means 28 can be configured to hold the cartomizer 12 by exerting a frictional force in cooperation with the internal surface 24. Advantageously this frictional force is sufficient to hold the cartomizer 12.

According to some possible embodiments, the gripping means 28 can be configured to hold the cartomizer 12 exclusively by the internal surface 24 of the internal compartment 17.

In this solution it is possible to remove the cartomizer 12 without having any portion of the external surface 11 of the letter covered during the optical inspection.

Furthermore, thanks to this solution the gripping means 28 are prevented from generating surface imperfections 19 on the external surface 11.

The gripping and moving members 27 can be configured to insert the gripping means 28 at least in part inside the internal compartment 17.

According to some embodiments, the gripping and moving members 27 can comprise sensors that detect the position of the blocking ring 16.

With regard to the position of the blocking ring 16 and therefore with regard to the actual depth of the internal compartment 17, the gripping and moving members 17 can position themselves inside the internal compartment without knocking against the blocking ring 16.

Consequently the blocking ring 16 does not have to be moved from its position after a contact with the gripping and moving member 27, and in particular with the gripping means 28.

The gripping and moving members 27 can be configured to put the gripping means 28 in contact with the edge 32 of the access opening 18.

According to some embodiments, the gripping means 28 can comprise suction nozzles to keep, during use, at least one portion of the gripping means 28 in contact with the internal surface 24.

The suction nozzles can be positioned in such a manner that, during use, they keep the gripping means 28 in contact with the edge of the access opening 18 of the cartomizer 12.

According to some embodiments, not illustrated, the gripping means 28 can comprise magnetic portions configured, when activated, to hold the cartomizer 12 magnetically.

These magnetic portions can be temporarily activated, for example, by means of an electric signal.

According to some embodiments, the gripping means 28 can comprise at least two gripping portions 33 that are movable between at least a first position and a second position, in which the gripping portions 33 are respectively either in contact or not in contact with the internal surface 24.

According to some embodiments, the gripping means 28 and in particular the gripping portions 33 can be moved radially with respect to the longitudinal axis of the gripping and moving means 27, in other words when in use with respect to the longitudinal axis Z of the cartomizer 12.

For example, the gripping portions 33 can be configured to expand themselves radially with respect to the central axis to bring themselves in contact with the internal surface 24 and apply, in cooperation with the internal surface 24, a frictional force so that the cartomizer 12 is held.

During use, the gripping portions 33 are configured to hold the cartomizer 12 in position.

The gripping portions 33 can be placed angularly distanced from each other. Advantageously the gripping portions 33 can be placed angularly equidistant from each other. For example, in the case of two gripping portions 33, they are placed at 180°, whereas in the case of three gripping portions 33, they are placed at 120°.

According to some embodiments, the gripping portions 33 present a support surface 34 that matches the internal surface 24 so that the two surfaces fit together.

According to some possible embodiments, the gripping portions 33 can be made of an elastic material in order to fit the internal surface 24 when they are in contact with the latter.

According to some embodiments, as the cartomizer 12 is removed by the gripping and moving member 27, i.e. when the gripping means 28 are active, the movable portion 23 frees the cartomizer 12 so that it can be removed with ease from the housing seat 21.

According to some possible embodiments, the rotation means 29 are configured to rotate the cartomizer 12 removed by the gripping and moving member 27 around the respective longitudinal axis Z. Each gripping and moving member 27 comprises respective rotation means 29, each configured to rotate respective gripping means 28.

According to some embodiments, not illustrated, the rotation means 29 can be configured to rotate the cartomizer 12 around an axis that is parallel to the longitudinal axis Z.

According to possible variants, the axis parallel to the longitudinal axis Z of the cartomizer 12 can be defined inside the volume of the cartomizer 12 in order to obtain an eccentric rotation.

According to possible variants, the axis parallel to the longitudinal axis Z of the cartomizer 12 can be defined outside of the volume of the cartomizer 12 in order to obtain a rotatory motion around the parallel axis.

These solutions can be used, for example, in cases in which at the end of the optical inspection the cartomizer 12 is to be placed in a different position from when it was removed.

The rotation means 29 are configured to rotate the cartomizer 12 in a direction of rotation, or in both directions of rotation, from a desired angle and at a desired angular velocity.

According to some embodiments, the optical acquisition device 30 is configured to frame the optical inspection zone 25.

The optical inspection zone 25 can be provided above the housing seats 21, or in any other zone which can be reached by the gripping and moving members 27.

When one or more cartomizers 12 are present in the optical inspection zone 25, the optical acquisition device 30 frames the cartomizers 12 and can acquire images 26 of their external surfaces 11.

According to some embodiments, an optical acquisition device 30 can contemporaneously frame more than one cartomizer 12, for example five of them.

In accordance with some possible embodiments, the surface quality inspection device 10 can comprise a plurality of optical acquisition devices 30. For example, the surface quality inspection devices 10 can comprise optical acquisition devices 30 that are able to acquire a plurality of images 25, in other words a video.

According to some embodiments, the optical inspection device 30 can comprise a CCD sensor, or other optical sensor, possibly also provided with apposite electromagnetic radiation filters.

The optical acquisition devices 30 can laterally frame a portion of the external surface 11.

When a larger number of cartomizers 12 is to be framed contemporaneously than can be framed by a single optical acquisition device 30, several optical acquisition devices 30 can be provided, framing different portions of the optical inspection zone 25.

In one embodiment, the apparatus 10 comprises at least two optical acquisition devices 30 framing the optical inspection zone 25 from two opposite positions with respect to the optical inspection zone 25.

According to some embodiments, the optical acquisition device 30 comprises a camera, advantageously a high speed or ultra high speed camera of the kind known in the art, able to take a great number of images 26 within a particular time frame.

Each optical acquisition device 30 is configured to acquire images 26 of the external surface 11 of the cartomizer 12 that is turned toward the optical acquisition device 30 itself, with the aim of verifying by means of the processing unit 31 whether any surface imperfections 19 are present.

The processing unit 31 can comprise a microprocessor having a plurality of parts each designed to perform a specific function, such as sending/receiving information and/or test or command signals, processing data, timing, or other known functions.

The processing unit 31 can be configured to process the images 26 in order to obtain a reconstructed image 35 of the specific external surface 11 of the cartomizer 12.

The reconstructed image 35 can be obtained by combining images 26 acquired of portions of the external surface 11.

The processing unit 31 can be configured to obtain reconstructed images 35 of a plurality of external surfaces 11 contemporaneously.

The processing unit 31 can be configured to provide an alert when a surface imperfection 19 is present on one or more cartomizers 12 after having obtained the respective reconstructed images 35.

For example, the processing unit 31 can signal such an event with an auditory or visual alert, or by sending a command signal for the removal of the damaged cartomizer 12.

The processing unit 31 can be configured to signal the presence of a surface imperfection 19 as soon as it is detected, i.e. during the acquisition of the images 26.

This makes it possible to speed up the inspection and avoids executing unnecessary operations.

If any surface imperfections 19 are detected, the processing unit 31 is configured to memorise the position of the cartomizer 12 when it is returned to the housing after the optical inspection.

Because the position of the damaged cartomizer 12 is known, it is subsequently possible to remove it.

Alternatively the processing unit 31 can be configured to remove the damaged cartomizer 12 from the assembly and/or inspection line.

In accordance with possible embodiments of the present invention, the optical inspection method can provide removing the cartomizer 12 by handling it exclusively by the internal surface 24.

According to some advantageous embodiments, the method provides acquiring the images 26 of the external surface 11 during the rotation of the cartomizer 12.

This makes it possible to speed up the inspection and avoids executing unnecessary operations and also to inspect the entire external surface 11 without having any part of it covered.

In fact the rotation is functionally advantageous for the inspection of portions of the external surface 11 that are not turned towards the optical acquisition device 30.

The method can provide rotating the cartomizer 12 by 360°.

The method can provide rotating the cartomizer 12 in an alternating manner in a first and second direction of rotation and for a desired angle of rotation.

The method can provide interrupting the rotation of the cartomizer 12 when the presence of a surface imperfection 19 on the external surface 11 is detected.

The method can provide acquiring one or more images of a first portion of the external surface 11 before rotating the cartomizer 12.

The method can provide acquiring images 26 of a portion of the external surface 11, rotating the cartomizer 12 and stopping it at an angular position that allows images 26 to be acquired of another portion of the external surface 11 not yet acquired. The acquired portions can be adjacent, or partly overlapping each other.

According to some embodiments, the method can provide acquiring the images 26 from at least two opposite positions with respect to the optical inspection zone 25.

In the case of two optical acquisition devices 30 framing the optical inspection zone 25, i.e. the cartomizer 12 from two opposite positions, the first portion acquired by the optical acquisition devices 30 comprises the two portions of the external surface 11, opposite to each other.

In this case it is not necessary to rotate the cartomizer 12 by 360° in order to acquire images 26 of the entire external surface 11, but only by 90°.

The rotation of the cartomizers 12 is advantageous in that it is possible to position the portions of the external surface 11 facing towards the optical acquisition devices 30.

This makes it possible to optically inspect portions of the external surface 11 that are not perpendicularly facing the framing area of the optical acquisition device 30.

In case of several adjacent cartomizers 12 along a linear direction orthogonal to the direction framed by the optical acquisition devices 30, it is possible to rotate the cartomizers 12 to visualise the portions of the external surfaces 11 initially facing the linear direction of the adjacent cartomizers 12.

According to some embodiments, the method provides acquiring images 26 of the entire external surface 11.

This acquisition of the entire external surface 11 can be executed by acquiring images 26 of a first portion and a second portion of the external surface 11. The second portion can be adjacent to, or partly overlapping the first portion.

The overlapping part of the two portions is advantageously used as reference by the processing unit 31 when obtaining the reconstructed image 35 of the external surface 11.

According to some embodiments, the method provides the contemporaneous inspection of a plurality of cartomizers 12.

According to some embodiments, the method provides the removal of one or more cartomizers 12 having a surface imperfection 19 on the external surface 11.

In accordance with some possible embodiments, in case the cartomizer 12 has at least one protective cap associated with at least one of its ends 14 and 15, the method provides removing the protective cap before, or during, the removing of the cartomizer 12 from the housing seat 21.

In this case, the method can provides returning the protective cap to the respective end 14 and 15 after having verified the possible presence of a surface imperfection 19 on the external surface 11.

In accordance with some possible embodiments, in case there are two optical acquisition devices 30, the method provides rotating the cartomizer 12 at a first angle θ1 equal to 90°.

According to some possible embodiments, in case there are two optical acquisition devices 30, the method can provide rotating the cartomizer 12 by a first angle θ1 greater than 90°. With this solution it is possible to acquire images 26 from portions of the external surface 11 that partly overlap each other, thus facilitating obtaining the reconstructed image 35.

According to some possible embodiments, if at least the portions of the external surface 11 not facing towards the optical inspection devices 30 are to be inspected with both optical inspection devices 30 available, the method can provide rotating the cartomizer 12 by a first angle θ1 equal to 90° in a first direction of rotation, and rotating the cartomizer 12 by a second angle θ2 equal to 180° in a second direction of rotation.

According to possible variants, the first angle θ1 can be greater than 90° and the second angle θ2 is equal to or greater than twice the first angle θ1.

According to some embodiments, the method provides rotating the cartomizer 12 to return it to the initial position, i.e. to the angular position it had when it was removed from the housing seat 21.

FIG. 7 illustrates the case in which the cartomizer 12 is rotated by an angle θr to return it to the initial position of FIG. 5.

By way of example, FIG. 8 illustrates a reconstructed image 35 in which the sectors 40, 41, 42, 43 represent the portions of the external surface 11 having the same references as the FIGS. 5-7.

It will be clear that modifications and/or additions of parts can be applied to the surface quality inspection method and related apparatus 10 as described here, without going beyond the scope of the present invention.

It will also be clear that, although the present invention is described with reference to a number of specific examples, a person skilled in the art will certainly be able to realize many other equivalent forms of the surface quality inspection method and related apparatus 10, having the characteristics as expressed in the claims and therefore all falling within the scope of protection as defined by these claims.

I claim:

1. A method to inspect surface quality of an external cylindrical surface of at least one component of inhalers or vaporizers, in particular a cartomizer for electronic cigarettes, said at least one component comprising a hollow cylinder having an internal surface opposite to the external cylindrical surface and delimiting an internal compartment, wherein said method comprises the steps of:
    providing said at least one component arranged in a housing seat;
    removing said at least one component from said housing seat, by holding it exclusively from the internal surface, thereby keeping the external cylindrical surface freely exposed therearound;
    positioning and maintaining said at least one component in an optical inspection zone outside said housing seat;
    rotating said at least one component in order to position it in at least two optical inspection positions angularly distinct with respect to each other;
    acquiring at least one image of a portion of said external surface in each of said at least two optical inspection positions; and
    processing the images acquired in order to verify if said at least one component has at least one surface imperfection on said external surface,
    wherein said acquiring step comprises acquiring at least one respective image of said external surface with at least two optical acquisition devices framing said at least one component from at least two opposite positions with respect to said optical inspection zone.

2. The method as in claim 1, wherein it provides to rotate said component around its own longitudinal axis.

3. The method as in claim 1, wherein it provides to acquire said images during the rotation of said component.

4. The method as in claim 1, wherein it provides to acquire images of the entire external surface.

5. The method as in claim 1, wherein said images comprise portions of said external surface adjacent to or partly overlapping each other.

6. The method as in claim 1, wherein it provides to rotate said component by an angle equal to 90°.

7. The method as in claim 1, wherein it provides to rotate said component to return it to its initial angular position.

8. The method as in claim 1, wherein it provides to remove and/or rotate and/or inspect a plurality of said components simultaneously.

9. The method as in claim 1, wherein, in the event that said component has at least one protection cap associated with at least one of its ends, said method provides to remove said protection cap before or during the removal of said component from said housing seating.

10. The method as in claim 9, wherein it provides to re-associate said protection cap with said end after having verified the possible presence of said surface imperfection on said external surface.

11. An apparatus to inspect surface quality of an external cylindrical surface of at least one component of inhalers or vaporizers, in particular a cartomizer for electronic cigarettes, said at least one component comprising a hollow cylinder having an internal surface opposite to the external cylindrical surface, and delimiting an internal compartment, the apparatus comprising:
    at least one gripper configured to remove said at least one component from a housing seat by gripping said at least one component from said internal surface and bring said at least one component to an optical inspection zone outside said housing seat, said at least one gripper further being configured to rotate said at least one component to position the at least one component in at least two optical inspection positions which are angularly distinct with respect to each other, said rotation being made while gripping the at least one component exclusively from the internal surface, thereby keeping the external cylindrical surface freely exposed therearound,
    at least two optical acquisition devices configured to frame said at least one component from two opposite positions with respect to said optical inspection zone in order to acquire at least one respective image of said external surface, and
    a processing unit configured to process said respective images acquired by said at least two optical acquisition devices in order to verify if said at least one component has at least one surface imperfection on said external surface.

12. The apparatus as in claim 11, wherein said at least one gripper is configured to rotate said component around its longitudinal axis.

13. The apparatus as in claim 11, wherein said at least one gripper comprises at least two gripping portions mobile between at least a first position, in which said gripping portions are in contact with said internal surface, and a second position, in which said gripping portions are not in contact with said internal surface.

14. The apparatus as in claim 13, wherein said gripping portions are radially movable with respect to the longitudinal axis of said component.

15. The apparatus as in claim 11, wherein said at least one gripper comprises one or more suction nozzles configured to keep, during use, at least one portion of said at least one gripper in contact with said internal surface.

* * * * *